No. 790,676. PATENTED MAY 23, 1905.
H. B. CARLTON.
FISHING REEL.
APPLICATION FILED SEPT. 14, 1904.
2 SHEETS—SHEET 1.
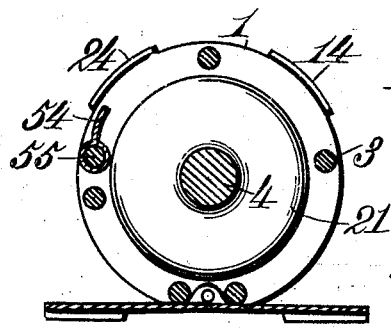
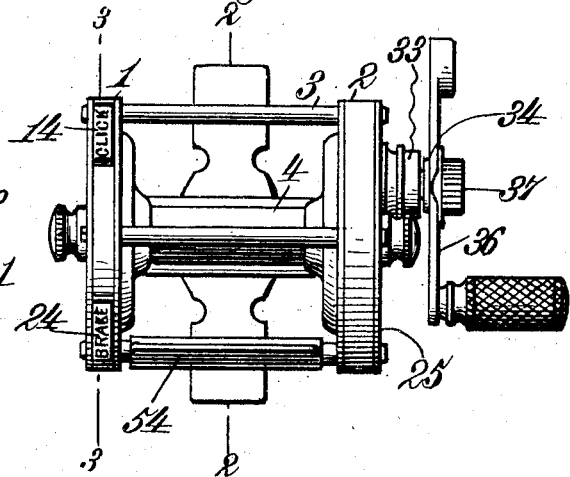
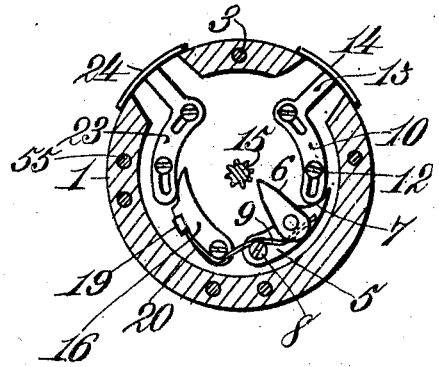
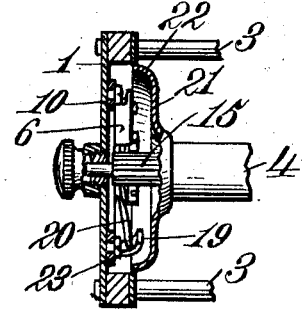
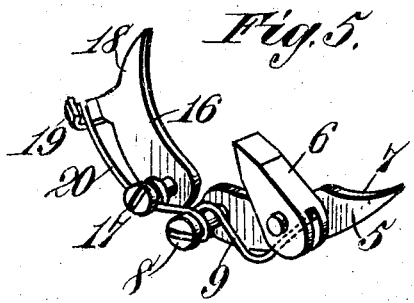
Witnesses.
Robert Everitt,
James L. Morris, Jr.
Inventor.
Harvey B. Carlton.
By James L. Norris.
Atty.

No. 790,676. PATENTED MAY 23, 1905.
H. B. CARLTON.
FISHING REEL.
APPLICATION FILED SEPT. 14, 1904.

2 SHEETS—SHEET 2.

Witnesses.
Robert Everitt,
James L. Norris, Jr.

Inventor.
Harvey B. Carlton,
By James L. Norris.
Att'y.

No. 790,676. Patented May 23, 1905.

UNITED STATES PATENT OFFICE.

HARVEY B. CARLTON, OF ROCHESTER, NEW YORK, ASSIGNOR TO CARLTON MANUFACTURING COMPANY, OF ROCHESTER, NEW YORK, A CORPORATION OF NEW YORK.

FISHING-REEL.

SPECIFICATION forming part of Letters Patent No. 790,676, dated May 23, 1905.

Application filed September 14, 1904. Serial No. 224,434.

*To all whom it may concern:*

Be it known that I, HARVEY B. CARLTON, a citizen of the United States, residing at Rochester, in the county of Monroe and State of New York, have invented new and useful Improvements in Fishing-Reels, of which the following is a specification.

This invention relates to fishing-reels, and has for its principal object to provide a simple and improved mechanism whereby the operating-gear may be thrown out of mesh with the reel proper or spool and the latter be permitted to rotate freely to facilitate the ease with which the cast may be made.

Further objects of the invention relate to improvements in the click mechanism, to improvements in the brake mechanism, and, finally, to certain novel combinations and arrangements of parts, as will more clearly appear hereinafter.

That which I claim as my invention will be indicated in the claims following the specification.

In order that the invention may be clearly understood, I have illustrated the same in the accompanying drawings, in which—

Figure 6:
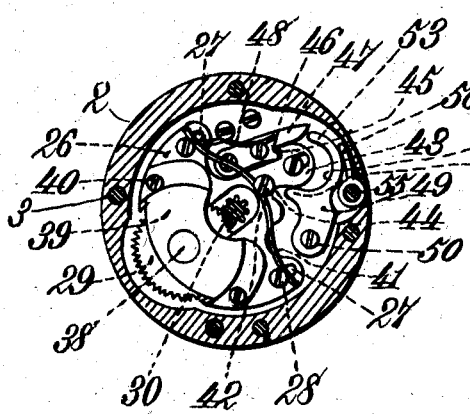
Figure 7:
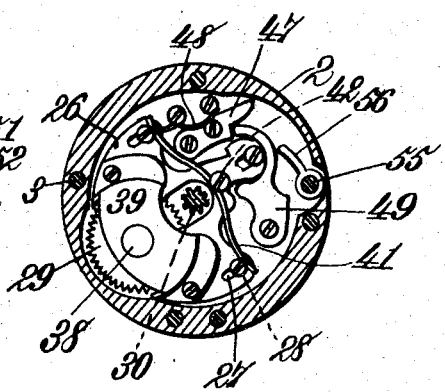
Figure 8:
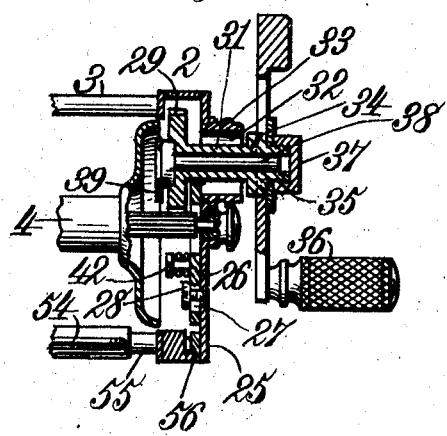
Figure 9:
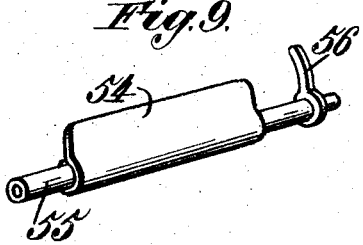

Figure 1 is a top plan view of a reel constructed according to my invention. Fig. 2 is a section taken on the line 2 2 of Fig. 1. Fig. 3 is a section taken on the line 3 3 of Fig. 1. Fig. 4 is a broken sectional view of the brake end of the reel. Fig. 5 is a detail perspective view of the click and brake mechanism. Fig. 6 is a sectional elevation illustrating one position of the operating-gear and of the mechanism for disconnecting the same from the reel-spool. Fig. 7 is a similar view showing the position of the parts when the operating-gear has been moved out of mesh with the pinion of the reel-spool. Fig. 8 is a broken sectional elevation of the end of the reel opposite to that shown in Fig. 4, and Fig. 9 is a detail view of the thumb-plate with its actuating-bar.

Referring now to the drawings, the reel is shown to comprise a frame formed by hollow heads 1 2, connected by posts 3. Rotatively mounted in the heads 2 3 is a spool 4. The head 1 has pivotally mounted at one end on its inner side a lever 5, near the outer end of which is pivotally mounted a click 6. The outer end of the lever 5 is provided with a curved recess 7. The pivot of the lever 5 is formed by a screw or pin 8, to which is secured one end of a leaf-spring 9, the other end of which bears upon the butt-end of the click 6. The spring 9 therefore not only operates to normally press the lever 5 inward to bring the click into action, but it also controls the movement of said click so that it will be held in yielding engagement with the pinion on the spool, as hereinafter explained.

10 indicates a curved slide-plate, which is provided with slots 11, working over screws 12, mounted in the end wall of the head. The slide-plate 10 has near one end an arm 13, which projects outwardly through a slot formed in the side of the head 1 and is provided on its outer end with a push-plate 14, which is adapted to slide over the side of the head 1 and is of sufficient length to always cover the slot through which the arm 13 projects, thus preventing dust and grit from entering the reel. The end of the slide-plate 10 opposite that provided with the arm 13 normally bears against and supports the outer end of the lever 5 and is adapted when it is moved toward said lever by means of the push-plate 14 to enter the recess 7, and thus raise the lever 5 and carry the click 6 out of engagement with the pinion on the spool. The said pinion is indicated by the numeral 15. When the push-plate 14 is moved in the opposite direction to that above described—that is, away from the lever 5—the spring 9 will automatically throw the lever 5 downward and bring the click 6 into engagement with the pinion 15. By this arrangement both the lever and click can yield, and thus I provide against breakage or derangement of the parts, such as might occur if the click should lock with one of the teeth of the pinion 15. It will further be seen that by this construction the click is automatically thrown into operation, but is mechanically or manually lifted out of engagement with the pinion 15 and positively held or locked in its inoperative position.

The brake is indicated by 16 and comprises a lever pivotally mounted on the inner side of the head 1, as indicated at 17, by means of a screw or pin and provided in its outer end with a curved portion 18. Extending inwardly at right angles to the lever 16 is an arm 19, constituting the brake-shoe. A spring 20 is secured at one end to the screw 17 and at its other end bears against the inner side of the brake-shoe 19 and tends normally to press the brake 16 outward or toward the inner wall of the head 1. The spool 4 is provided at opposite ends with circular plates 21, the edges of which are curved outwardly, as indicated at 22, and when in position within the frame the curved edge of one of these plates is adapted to lie between the brake-shoe 19 and the inner wall of the head 1.

23 indicates a slide-plate similar in all respects to the slide-plate 10 and which is adapted to be actuated by a push-plate 24. The outer or free end portion of the slide-plate 23 rests against the outer end portion of the brake 16, and when the said slide-plate is moved toward the brake by means of the push-plate 24 its end engages the curved portion 18 and presses the free end of the brake inward or toward the center of the reel thereby carrying the brake-shoe 19 away from and out of contact with the curved edge 22 of the spool. When the slide-plate 23 is moved in a direction away from the brake, the spring 20 automatically throws the brake outward and holds the brake-shoe in contact with the curved edge of the spool, thereby affording the requisite yielding resistance to the turning thereof.

The head 2 of the reel is closed on its outside by means of a plate 25, and on said plate is mounted the operating mechanism for the reel, as will now be described. 26 indicates a plate which is slidably mounted on the inner side of the end plate 25 through the medium of slotted apertures 27, formed in said plate, and screws 28, passed through said slotted apertures and engaging in the end plate. For the purpose of clearness in description I will hereinafter refer to the plate 26 as the "gear-plate."

29 indicates the main operating-gear, which is adapted to mesh with a pinion 30 on the reel-spool. The gear 29 is provided with an arbor 31, which passes through an aperture 32 of considerably greater diameter than said arbor to permit movement of the gear 29 and its arbor, as hereinafter described. The aperture 32 is surrounded on the outer side of the plate with a sleeve 33, the mouth of which is closed against the entrance of dust and grit by means of a disk 34, formed integral with the arbor and intermediate the ends thereof. The disk 34 is also provided with a lug 35 for receiving the crank-handle 36 of the reel, which handle is secured in place by means of a cap 37, screwed on the outer end of the arbor 31. The bearing for the gear 29 and its arbor is provided by a spindle 38, carried by a cap-plate 39, said spindle passing through an aperture extending through the operating-gear and its arbor and the cap-plate 39 being secured to the gear-plate 26 by means of screws 40.

From the construction above described it will be seen that the gear-plate 26 can be moved to carry the operating-gear 29 with it out of engagement with the pinion 30. A spring 41, centrally secured to a screw 42 on the gear-plate and having its outer free ends bearing against two of the screws 28 at opposite sides of the gear-plate, tends normally to press the gear-plate inward and hold the operating-gear 29 into engagement with the pinion 30. The means for operating this gear-plate will now be described.

The gear-plate 26 is shown to be provided with a centrally-projecting portion 43, which on one side is provided with a curved recess 44 and on its opposite side with a squared shoulder 45, which is normally engaged by a projection 46 on a pivoted dog 47, which is normally held to such position by means of a spring 48. The outer end of the dog projects beyond the end of the projecting portion 43 of the gear-plate, as shown.

49 indicates a lever pivotally mounted at one end of the plate 25, as indicated at 50, and provided in its outer end portion with an enlarged recess 51, which forms a lug 52, adapted to engage in a curved recess 44 on the gear-plate, and a finger 53, which normally engages the inner side of the outer end portion of the dog 47. The recess 51 is adapted to receive the outer end of the projection 43 of the gear-plate in the movement of the lever 49.

54 indicates a thumb-plate which is secured on a bar 55, which latter is pivotally mounted at its ends in the heads of the reel. On one end of said bar is secured an arm 56, which works within a suitable recess provided in the head 2 and is adapted to be actuated by the thumb-plate 54 to press against and move the lever 49 inward. In this motion of the lever the finger 53 first operates to throw the dog 47 out of engagement with the shoulder 45 of the gear-plate and then the lug 52 engages in the curved recess 44 and moves the said gear-plate outward, such outward movement of the gear-plate being limited by the engagement of the slots thereof with the screws 28. When pressure is removed from the thumb-plate 54, the spring 41 will again throw the gear-plate inward to bring the operating-gear into mesh with the pinion on the spindle and the dog 47 will be pressed inward by its spring to engage the shoulder on the gear-plate and simultaneously by engagement with the finger 53 to throw the lever 49 and the thumb-plate 54 back to their normal positions. The engagement of the dog with the gear-plate prevents the latter from accidental displacement in the operation of the reel. By mounting the thumb-plate on a bar which is pivotally mounted in the ends of the reel I thereby obviate the employment of apertures permitting the entrance of dust and grit to the reel.

The operation of the various parts enumerated has been outlined in the above description and need not be recited with more particularity.

Having thus fully described my invention, what I claim as new, and desire to secure by Letters Patent, is—

1. A reel comprising a frame having a spool mounted therein provided with a pinion, a gear-plate slidably mounted on said frame and movable in a straight line toward and from the pinion and carrying a gear normally meshing with said pinion, and means for moving said gear-plate to throw said gear into and out of mesh with said pinion.

2. A reel comprising a frame having a spool rotatably mounted therein and provided with a pinion, a gear-plate slidably mounted on said frame and movable in a straight line toward and from the pinion and carrying a gear normally meshing with said pinion, a spring for holding said gear-plate in its normal position, and means for moving said gear-plate to throw said gear out of mesh with the pinion.

3. A reel comprising a frame having a spool mounted therein and provided with a pinion, a gear-plate slidably mounted on said frame and carrying a gear normally meshing with said pinion a spring for holding said gear-plate in its normal position, a spring-controlled dog engaging said plate for locking it in said position, a pivoted lever operating to throw said dog out of engagement with the gear-plate and then to engage the gear-plate to move the same, and means for operating said lever.

4. A reel comprising a frame having a spool mounted therein and provided with a pinion, a gear-plate slidably mounted on the frame and carrying a gear normally meshing with said pinion, a spring operating to hold said gear-plate in its normal position, a pivoted lever for engaging said gear-plate to move the same, a spring-controlled dog engaging said gear-plate to lock the same in its normal position and in normal engagement with said lever, and means for actuating said lever, the lever in operation moving the dog out of engagement with the gear-plate and the dog operating to return the lever to its normal position when pressure is removed therefrom.

5. In a reel in combination with a spool having a pinion, a bodily-movable gear normally engaging said pinion for operating the same, and means for moving said gear out of mesh with said pinion comprising an actuating-bar pivotally mounted in opposite ends of the reel and carrying a thumb-plate.

6. A reel comprising a frame having a spool mounted therein and provided with a pinion, a bodily-movable operating-gear suitably mounted on said frame and normally in mesh with said pinion, a lever for moving said gear out of mesh with said pinion, and means for actuating said lever comprising a bar pivotally mounted in the ends of the frame and having an arm for engaging said lever and a thumb-plate mounted on said bar for turning the same.

7. A reel comprising a frame having a spool mounted therein, a brake comprising a pivoted lever having a brake-shoe, a spring controlling said lever and operating normally to hold said brake-shoe in engagement with the spool, a slide-plate mounted on the frame and adapted to engage said lever to throw the brake-shoe out of engagement with the spool, and a push-plate mounted on the outer side of the frame for operating said slide-plate.

In testimony whereof I have hereunto set my hand in presence of two subscribing witnesses.

HARVEY B. CARLTON.

Witnesses:
  CARRIE L. CAMPBELL,
  CHAS. E. HUTCHINGS.